UNITED STATES PATENT OFFICE 2,254,109

PROCESS OF HYDROLYZING GLYCERIDES

Edward A. Nill, Detroit, Mich., assignor to The H. A. Montgomery Company, Detroit, Mich., a corporation of Michigan No Drawing. Application August 18, 1938, Serial No. 225,585

5 Claims. (Cl. 260—416)

This invention relates to a process of treating fats to obtain free fatty acids and glycerin.

Heretofore a number of processes have been developed for carrying out the reaction to cause fats and fatty glycerides to be broken up into free fatty acid and glycerin. One process commonly used is that using a catalyst termed "Twitchell's reagent," which, in the presence of a small amount of sulphuric acid, acts to carry out the above reaction. However, to carry out the reaction on a batch of fatty material, such, for example, as tallow, it is necessary to steam the mixture of the tallow with water and the reagent or catalyst for a period of 20 hours or more. Due to the amount of water present in the first instance and to the condensation of steam in carrying out the process, the resultant glycerin solution is very dilute, i. e., around a 6% or 7% solution of glycerin.

According to my invention, fatty glycerides, such as tallow, for example, may be hydrolyzed in a relatively short time and the glycerin obtained would be of any desired concentration up to 70% or so.

An object of the invention is to provide an improved method for carrying on the hydrolysis of various animal and vegetable fatty glycerides to obtain the free fatty acids and glycerin.

A further object is to provide a process which may be carried on in a relatively simple manner and in a relatively short time, thereby considerably reducing the cost.

Another object is to provide a process in which the treating materials may be largely recovered, and in which the glycerin may be obtained in relatively high concentrations, if desired.

Other objects of the invention will be apparent from the following description.

If the fat or oil to be treated is one that has considerable impurities present, such as proteins, coloring matter, etc., it is desirable to preheat the fat or oil with strong sulphuric acid, such as 60° Baumé, which destroys or disintegrates such impurities. The fat is then in better condition to be hydrolyzed with greater facility. This preliminary preheating of the fat or oil, however, is not necessary if the fat or oil does not contain any considerable percentage of impurities.

The fat is kept well above its melting point, preferably at some temperature between 100° and 200° F., depending on the fats or mixture of fats to be treated. In another tank there is disposed the treating mixture, which comprises sulphuric acid in a relatively small amount, such as substantially 1% or so, of the fatty glyceride, and substantially 1% or so of a petroleum derivative containing a sulphonic acid radical. Such a derivative may be from refined mineral oils or crude petroleums. A petroleum of the ichthyol type is one very desirable for treatment to form the sulphonic acid or sulphonic acid derivative for use in the process. A soluble alkali metal sulphonate of a mineral oil hydrocarbon may be used instead of sulphonic acid, in which case a correspondingly higher percent of sulphuric acid may be used, so that an excess of sulphuric acid is present, thereby assuring the presence of sulphonic acid in the mixture.

Examples of suitable sulphonates that may be used advantageously are the water-soluble alkali metal sulphonates of mineral oils or crude petroleums. Alkali metal sulphonates of crude petroleum of the ichthyol type are very efficient for treating purposes, and may be made by treating the crude with strong sulphuric acid and neutralizing with an alkali metal hydroxide, such as sodium, potassium or ammonium, thereby obtaining a water-soluble alkali metal sulphonate. This ichthyol type petroleum is found at shallow depths in certain parts of Texas and has an unsaturated naphthene base, and contains very little of the lighter hydrocarbons. It usually has an initial boiling point of 500° F., or over, and, consequently, produces substantially no naphtha, gasoline or kerosene when refined. Such petroleum also yields a relatively large percentage of sulphonic acid derivatives upon treatment with strong sulphuric acid.

The sulphuric acid and sulphonated mineral oil hydrocarbons are dissolved in water and mixed with the fat to be treated. The amount of water used may be somewhat dependent on the concentration of glycerin which it is desired to produce. At the same time it is a practical advantage to provide an excess of water to insure that the hydrolyzing reaction will not be reversed during the process and cause some sulphonation of the fat being treated.

While the water-soluble petroleum derivatives containing sulphonic acid radicals are preferable for ingredients of the treating agents, it is to be understood that the oil-soluble derivatives may also be used.

The mixture above described may be termed the "treating liquor," and it is kept at substantially the same temperature as the melted fat to be treated.

The fat and the treating liquor are fed in liquid form to a type of colloidal mill known as an homogenizer. They are fed in predetermined proportions to obtain the desired concentration of glycerin. For example, if the fat to be treated is substantially all glyceride, and it be desired to obtain a high percentage of glycerin, such as 60%, the glyceride and the treating composition would be fed to the homogenizing apparatus in the proportion of approximately 60 parts of the glyceride to 2 parts of the treating composition.

The sulphuric acid and sulphonated mineral oil hydrocarbons should be present in the treating solution in the amount of about 1% each of the total combined fat, not including the free fatty acid, if such be present.

The homogenizer may be of the type in which the fat to be treated and the treating liquor are caused to flow in a thin, continuous film over a rotating surface. In such apparatus the mixed liquids to be treated are preferably admitted in a limited or controlled manner to the central region of a slightly concave, rotating disk or plate, so that the mixture of liquids will be projected thereover in a film of extreme thinness. After the film leaves the disk it may be conducted against a wall of the container.

The control means may be a floating guard or barrier disposed above the rotating disk, so that the liquids pass between the barrier and the disk in a very thin film, and drops or larger quantities of liquid cannot be projected across the rapidly rotating disk.

By causing the liquids to be mixed and to move in a film over the surface of the disk, which is rotated at high speed, the hydrolyzing action takes place, causing the fat or fatty glyceride to be broken up into fatty acid and glycerin in the presence of the sulphuric acid and sulphonic acid. The liquids from the homogenizing machine are conducted to the storage tank and, if permitted to stand, will separate readily into three layers, the lower layer comprising a mixture of the glycerin, sulphuric acid and water, the second layer the sulphonated mineral oil hydrocarbons, and the top layer the free fatty acids or mixtures thereof.

If a small percentage of free fatty acid be present in the fatty material being treated, the splitting of the fat is facilitated and the time of reaction is decreased. It is, therefore, desirable, if the fat does not contain a small percentage of free fatty acid, to provide an amount of free fatty acid, such as 1% or so of the fatty material to be treated. This may be mixed thoroughly with the fatty material before it is conducted to the homogenizing machine.

The dilution of the glycerin solution may be controlled by passing the fat and treating liquor through the homogenizer a plurality of times to cause sufficient hydrolyzation of the fat, and thereby obtain the desired proportion of glycerin. When using this means of control the amount of water used in the treating liquor may be varied within reasonable limits, taking care that there is enough water present to prevent reversal of the hydrolyzation and sulphonation of the fat.

Another method of controlling the dilution of the glycerin product is to include in the treating liquor the approximate amount of water necessary to carry out the hydrolyzation to a feasible limit for the desired dilution, and also an amount of water to provide a slight excess. When this is done the fat and treating liquor need only to be passed through the homogenizer the necessary number of times to hydrolyze the fat.

From a practical viewpoint the most suitable method for obtaining the desired dilution of glycerin is a combination of the above two methods. That is, a little more than the necessary amount of water is added to the treating liquor for a predetermined dilution of the glycerin product, and the mixture is passed through the homogenizer until such dilution has been obtained. In this manner the fat treated will be more nearly completely hydrolyzed in a minimum time.

In order to avoid building up too great a concentration of glycerin water, which tends to retard the reaction, provision may be made in the tank for receiving the liquids from the homogenizing machine to draw off a portion of the glycerin water from time to time. The treating liquor, of course, may be passed through the homogenizer repeatedly and additional homogenizing liquor may be added when desired.

After such recirculations the liquid from the homogenizer is permitted to stand in the storage tank, and it separates into layers, as indicated above, from which the free fatty acids and glycerin may be obtained, and the sulphonic and sulphuric acid may be recovered for reuse in the treatment of glycerides.

The glycerin water obtained in the process may contain some sulphonated mineral oil hydrocarbons, and these may be removed from the glycerin solution by treating it with lime and filtering or settling.

The fat and treating liquor may be pumped under pressure through the homogenizing apparatus, and, if the fat or fats to be treated have a melting point above room temperature, it is desirable that the homogenizing apparatus be steam jacketed, so that the fat and liquors will remain liquid during passage through the machine.

One embodiment of an apparatus for carrying out the process disclosed herein is the general type of apparatus shown in the Cornell Patent No. 2,042,880, granted June 2, 1936. It is to be understood, however, that other homogenizing or colloidal mill type apparatus which will cause such intimate mixing of the liquids at high speeds, and in minute quantities, as to effect hydrolyzation may be used.

In carrying out my process it is to be noted that the melted or liquid fats can be run through the machine at the rate of many gallons per minute, depending on the size of the machine and capacity of the pumps. It is perfectly practicable for the machine to be constructed and operated so that 25, or even 50, gallons of fat, together with the necessary amount of treating solution, may be passed through the machine each minute. The collected mixture may readily be retreated a sufficient number of times to obtain substantially complete hydrolyzation.

It will be seen that with my process of hydrolyzation great economies may be effected, in that a given amount of fat may be treated according to my process in much less time than by the old processes of steaming for many hours. Also, the glycerin solution obtained by my process may be highly concentrated, such as 70% or so. By controlling the process in a manner previously described, the concentration of glycerin obtained may be any desired amount from a dilute solution up to one of 70% or so of glycerin.

Furthermore, fats, when treated according to a process embodying the present invention, may be more completely hydrolyzed than was possible in other methods, due to the more intimate association of the ingredients during the reaction. This feature alone will effect an increase in the efficiency of such a process.

While I have described the preferred form of my method, I wish it to be understood that I do not desire to be limited to the details thereof, as various modifications may occur to a person skilled in the art.

What I claim is:

1. The process of hydrolyzing fatty glycerides, which comprises proportionally admixing the glyceride in liquid condition with a treating liquor containing sulphuric acid and sulphonated mineral oil hydrocarbons of the ichthyol type, substantially impounding the admixture, and controlling the discharge of the mixture of liquids, so that only a thin continuous film is permitted to escape across a swiftly moving surface.

2. The process of hydrolyzing fatty glycerides which comprises admixing fatty glycerides in liquid condition with an aqueous treating liquor containing sulphuric acid and a petroleum derivative containing a sulphonic acid radical, impounding the mixture and projecting a continuous film of extreme thinness from the impounded mixture, collecting the film, and separating the resultant products.

3. The process of hydrolyzing fatty glycerides to obtain a concentrated glycerine solution which comprises admixing the glycerides with a petroleum derivative containing a sulphonic acid radical, sulphuric acid and a sulphonation inhibiting amount of water, and causing the liquids to be intimately contacted throughout large areas by disposing them in a thin swiftly moving film until hydrolyzation ceases.

4. The process of hydrolyzing fatty glycerides to obtain a glycerine solution of any desired dilution up to approximately 70% which comprises proportionally admixing the glyceride with an aqueous treating solution containing sulphuric acid, a petroleum derivative containing a sulphonic acid radical and a hydrolyzing amount of water plus a sulphonation inhibiting excess of water, disposing the mixture in a thin swiftly moving continuous film to intimately contact ingredients of the mixture until the glyceride content is substantially hydrolyzed, collecting the film, and separating the resultant products.

5. The process of hydrolyzing fatty glycerides to obtain a glycerine solution of any desired dilution up to approximately 70% which comprises proportionally admixing the glyceride with an aqueous treating solution containing about 1% of sulphuric acid, up to about 1% of petroleum derivative containing a sulphonic acid radical and a hydrolyzing amount of water plus a sulphonation inhibiting excess of water, disposing the mixture in a thin swiftly moving continuous film to intimately contact ingredients of the mixture until the glyceride content is substantially hydrolyzed, collecting the film, and separating the resultant products.

EDWARD A. NILL.